Dec. 10, 1935.    D. P. RUGER    2,023,823
SOLDERLESS CONNECTER FOR ELECTRIC CABLES
Filed Jan. 17, 1931
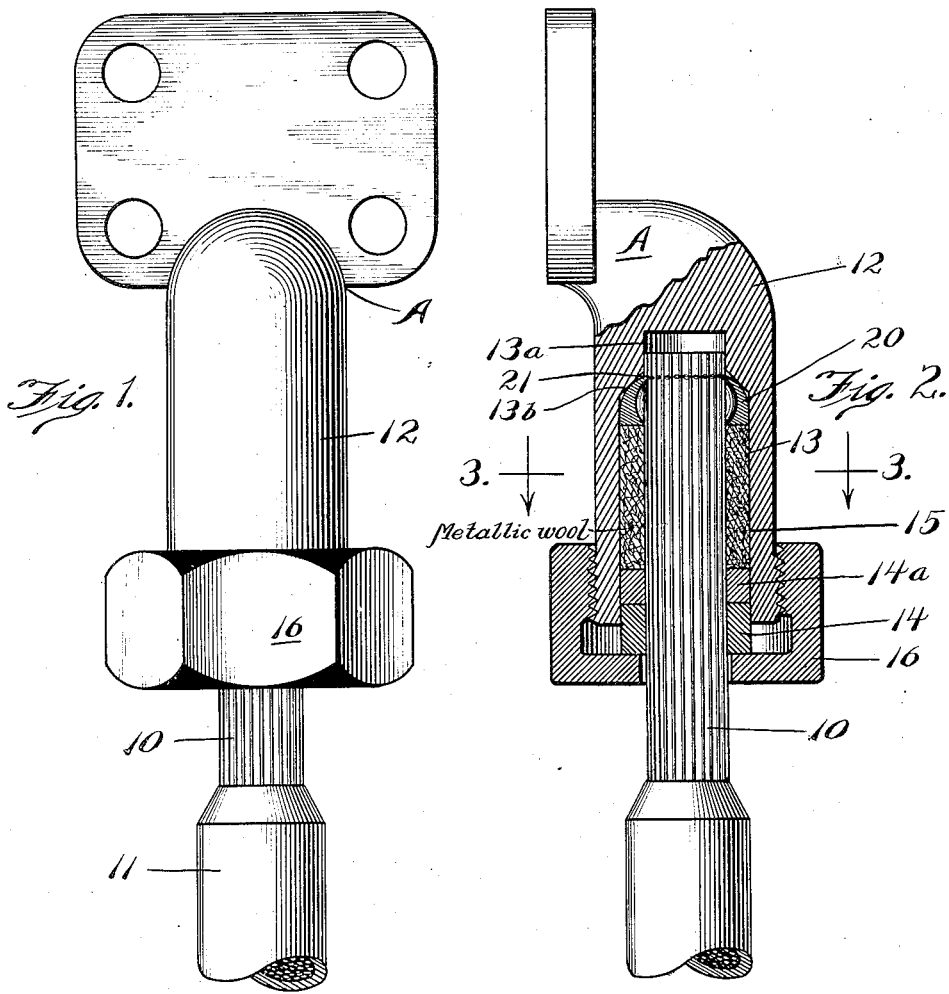
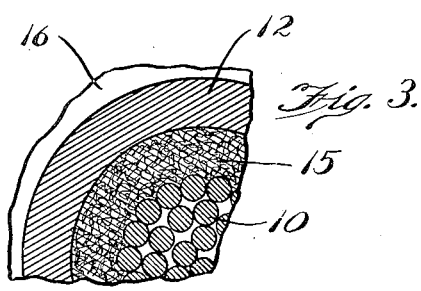

Patented Dec. 10, 1935

2,023,823

UNITED STATES PATENT OFFICE 2,023,823

SOLDERLESS CONNECTER FOR ELECTRIC CABLES

Durl P. Ruger, Chicago, Ill., assignor to G & W Electric Specialty Co., Chicago, Ill., a corporation of Illinois Application January 17, 1931, Serial No. 509,289

16 Claims. (Cl. 173—269)

This invention relates to electric cable connection and particularly to a solderless connection for electric cables of the stranded type.

One of the objects of the invention is to provide a mechanical bond without solder.

Another object of the invention is to provide a frictional contact that will secure the parts in position.

Another object of the invention is to provide means for obtaining maximum surface contact of the strands of the cable.

In the drawing—

Fig. 1 is a front elevation of the connecter;

Fig. 2 is a side elevation in part section; and

Fig. 3 is a trans-axial view taken at the line 3—3 in Fig. 2.

The cable 10 is of the usual sheathed type as indicated at 11 and this sheathing is removed for a distance at the end thereof for making electrical contact with some sort of a terminal fitting which is usually secured by soldering or some such expedient.

In the present case the terminal fitting A consists of a hollow portion 12 for receiving the cable 10. The bore 13 is of sufficient diameter to accommodate a packing gland follower 14 and packing material 15. The gland 14 is acted upon by a gland nut 16 and reacts through a sub-gland 14ᵃ on the packing 15. The purpose of the second gland member 14ᵃ is to lessen the tendency of the rotating action of the screw threaded gland nut 16 from distorting the packing material 15.

At the bottom of the bore 13 is a counter-bore 13ᵃ of approximately the diameter of the cable end 10 and is joined to the bore 13 by the sloping shoulder 13ᵇ. The purpose of this sloping shoulder 13ᵇ is to cooperate with a friction device 20 for assisting in supporting the cable in position. This friction device 20 is formed with a sharp inturned edge 21, whch when forced in position by the gland 16 (acting through the packing 15) will impinge against the peripheral strands of the cable 10. Although this impinging action is primarily for assisting in supporting the cable, it will also add somewhat to the conductivity of the device. However, the action of the packing material 15 is mainly relied upon to transmit the current from the cable to the fitting A.

It will be noted as illustrated in Fig. 3, that because of the stranded construction, the periphery of the cable is of irregular contour and it is desirable to contact as much of the surface as possible. Therefore the packing 15 here contemplated is of the nature of metallic wool, that is, finely stranded fiber of metal. This permits of great flexibility and ductility and when compressed between the abutment or friction device 20 and the sub-gland 14ᵃ it tends to flow into all the crevices formed by the tangent peripheral strands. Pressure is applied by the nut 16 to a sufficient degree calculated to produce proper contact between the bore 13ᵃ and the cable strands.

The metal employed for the packing 15 is of such material as will match that of the cable 10 and fitting A, so as to avoid the undesirable consequences of any electrical reaction that might be set up by complementary metalism. For instance, zinc fibers would be avoided where a copper cable is used. In the instance of an aluminum cable the packing would preferably also be aluminum.

Many modifications of the specific form of the device here shown may be employed without departing from the scope of conception.

I claim:—

1. In a device of the character described including a cable and a terminal fitting therefor, means in the terminal fitting for accommodating the cable end and metallic fiber packing for contact therewith, and means for compressing said fiber packing to force it into the crevices between the cable strands.

2. A device of the class specified comprising a terminal fitting adapted to receive a cable end, a device having a sharp edge surrounding the cable end and having its sharp edge making contact with the strands thereof, a compressible element in the fitting adjacent said sharp edged device, and means for compressing said element against said device so as to press the sharp edge of said device against the cable strands and also compress said element against the cable strands and fitting.

3. A device of the class specified comprising a terminal fitting having a chamber to receive the strands of the cable end, an annular gripping member surrounding the cable and arranged within said chamber, metallic packing also in the chamber and surrounding the cable strands adjacent said annular member, washers in the chamber adjacent said packing, and a threaded nut mounted removably on the fitting and adapted to compress the washers against the packing and the packing against said annular member.

4. In a device of the character described including a cable and a terminal fitting therefor, inherently compressible metallic packing in the fitting surrounding the cable end, an impinging device including a sharp edge also surrounding the cable end and contacting therewith, and means for compacting said packing and impinging device.

5. In a device of the character described including a cable and a terminal fitting therefor, an impinging device having a sharp edge, a packing of current transmitting character adjacent said impinging device, means on the fitting for directing the sharp edge of the impinging device against the cable, and means for compacting the packing in the fitting and actuating the sharp edge of the impinging device in engagement with the cable.

6. A device of the class specified comprising a terminal fitting having an open ended chamber adapted to receive the ends of the cable strands, an annular member at the inner end of said chamber provided with a sharp edge to make contact with the cable strands, metallic packing also in the chamber and surrounding and in contact with the cable strands and adjacent said annular member, and a threaded nut adjustably mounted on the fitting and adapted to close the open end of said chamber and compress the packing and annular member therein.

7. A fitting of the class specified having a gripping device adapted to be forced inwardly against a cable conductor to grip and hold the same, and a contact device for making contact with the cable conductor and electrical connection between said conductor and the fitting, said contact device being adjustable to permit it to be forced against the cable conductor and said gripping and contact devices being associated together so that when one is actuated to tighten it against the cable conductor the other device will also be tightened.

8. A fitting of the class specified comprising a gripping device adapted to be forced inwardly against a cable conductor to grip and hold same, and made adjustable to permit it to be tightened on the cable to grip the latter more firmly and a contact device for making contact with the cable conductor and establishing connection between said conductor and the fitting, said contact device being adjustable to permit compression of the device against the cable conductor to make better electrical connection, said gripping and contact devices being associated together so that when the contact device is compressed against the cable to make better electrical connection, the gripping device will also be compressed against the cable conductor to grip the same more firmly.

9. A fitting of the class specified comprising a gripping device adapted to be forced inwardly against a cable conductor to grip and hold same and made adjustable to permit it to be tightened on the cable to grip the latter more firmly and a contact device for making contact with the cable conductor and establishing connection between said conductor and fitting, said contact device being adjustable to permit compression of the device against the cable conductor to make better electrical connection, and said devices being in the same chamber in the fitting and arranged end to end lengthwise of the cable conductor, and means for acting upon one of said devices to contract it and cause it to contract the other device.

10. A fitting of the class specified comprising a gripping device for gripping a cable to hold it in position, said gripping device involving an adjustable penetrating edge for contacting and engaging the cable conductor, and a compressible connecting device involving a metallic packing member adapted to make connection between the cable conductor and the fitting.

11. A fitting of the class specified comprising a gripping device for gripping the cable to hold it in position, said gripping device involving an adjustable penetrating edge for contacting and engaging the cable conductor, a compressible connecting device involving a metallic packing member adapted to make connection between the cable conductor and the fitting, and means for actuating said devices to tighten the grip of the gripping device and compress the metallic packing to make better electrical connection.

12. A fitting of the class specified comprising a gripping device for gripping the cable to hold it in position, said gripping device involving an adjustable penetrating edge for contacting and engaging the cable conductor, a compressible connecting device involving a metallic packing member adapted to make connection between the cable conductor and the fitting, and means for actuating said devices, said last mentioned means comprising an adjustable element arranged to act upon the contact device and compress it against the cable conductor and also to act upon the gripping device and force its penetrating edge against the cable conductor.

13. A fitting of the class specified comprising a gripping and holding device having a penetrating edge adapted to contact with and penetrate the cable conductor, a compressible metallic packing device arranged adjacent said gripping device and adapted to actuate the latter when said contact device is contracted, and means for actuating said contact device to contract it and cause it to actuate the gripping device.

14. A fitting of the class specified comprising an annular holding member surrounding the cable conductor and having a penetrating edge to engage said conductor, an annular contractible member also surrounding the cable conductor and arranged adjacent to said first mentioned annular member, and means for acting upon said contractible member to compress it upon the cable conductor and also to cause it to act upon the first mentioned annular member and force its penetrating edge against said conductor.

15. A fitting of the class specified comprising a chamber to receive a cable conductor having the end through which the conductor enters open, a contractible annular member near the inner end of said chamber, said member having an edge to impinge upon the cable conductor to hold the same in position, mineral wool packing in said chamber between the annular member and the open end of said chamber and a threaded nut on the fitting to compress said mineral wool packing and force the same against the cable conductor and inner wall of said chamber and also against said first mentioned annular member to force the impinging edge of the same against the cable conductor.

16. A fitting of the class specified comprising a chamber to receive a cable conductor having the end through which the conductor enters open, a contractible annular member near the inner end of said chamber, said member having an edge to impinge upon the cable conductor to hold the same in position, mineral wool packing in said chamber between the annular member and the open end of said chamber and a threaded nut on the fitting to compress said mineral wool packing and force the same against the cable conductor and inner wall of said chamber and also against said first mentioned annular member to force the impinging edge of the same against the cable conductor, the inner end of said chamber having sloping shoulders to direct the impinging edge of said annular member inwardly against the cable conductor and there being washers in the outer end of said chamber against which said threaded nut acts.

DURL P. RUGER.